(12) United States Patent
Yasue

(10) Patent No.: US 9,329,736 B2
(45) Date of Patent: May 3, 2016

(54) CAPACITIVE TOUCH PANEL INPUT DEVICE THAT MEASURES INTERNAL RESISTANCES FOR COMPENSATION

(71) Applicant: KABUSHIKI KAISHA TOKAI RIKA DENKI SEISAKUSHO, Aichi (JP)

(72) Inventor: Yoshifumi Yasue, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 37 days.

(21) Appl. No.: 13/952,416

(22) Filed: Jul. 26, 2013

(65) Prior Publication Data
US 2014/0035868 A1    Feb. 6, 2014

(30) Foreign Application Priority Data

Aug. 2, 2012  (JP) .................................. 2012-171916

(51) Int. Cl.
*G06F 3/041*    (2006.01)
*G06F 3/044*    (2006.01)

(52) U.S. Cl.
CPC .............. *G06F 3/044* (2013.01); *G06F 3/0416* (2013.01); *G06F 3/0418* (2013.01)

(58) Field of Classification Search
CPC ..... G06F 3/044; G06F 3/0416; G06F 3/0418; G06F 3/041
See application file for complete search history.

(56) References Cited

U.S. PATENT DOCUMENTS

| | | | | |
|---|---|---|---|---|
| 5,283,559 | A * | 2/1994 | Kalendra et al. ............... | 345/168 |
| 8,446,158 | B1 * | 5/2013 | Jansson ........................ | 324/686 |
| 8,570,301 | B2 * | 10/2013 | Land et al. .................... | 345/174 |
| 2006/0017701 | A1 * | 1/2006 | Marten et al. ................. | 345/173 |
| 2010/0289769 | A1 * | 11/2010 | Watanabe ............. | G06F 3/0418 345/174 |
| 2010/0315102 | A1 * | 12/2010 | Portmann ...................... | 324/680 |
| 2013/0278538 | A1 * | 10/2013 | Brunet et al. ................. | 345/174 |
| 2013/0328952 | A1 * | 12/2013 | Bae ............................... | 345/698 |

FOREIGN PATENT DOCUMENTS

JP    2011-076515    4/2011

OTHER PUBLICATIONS

Chinese Office Action for application No. 201310303057.4 dated Dec. 4, 2015 and English translation.

* cited by examiner

*Primary Examiner* — Larry Sternbane
*Assistant Examiner* — Darlene M Ritchie
(74) *Attorney, Agent, or Firm* — Roberts Mlotkowski Safran & Cole, PC

(57) ABSTRACT

An input device includes a selection circuit to which a plurality of electrodes disposed in a capacitive touch panel are connected, a line connected to the selection circuit and having a same internal resistance as that between the plurality of electrodes and the selection circuit, an A/D conversion part connected to the selection circuit so as to measure a voltage of the electrodes or a measurement value when the line is connected thereto, wherein the electrodes and the line are each connected selectively to the A/D conversion part by the selection circuit, and a control part configured to control the selection circuit so as to allow the A/D conversion part to measure a voltage of one of the electrodes and the measurement value, and to calculate an electrostatic capacitance of one of the electrodes based on the voltage of one of the electrodes and the measurement value.

4 Claims, 2 Drawing Sheets

CAPACITIVE TOUCH PANEL INPUT DEVICE THAT MEASURES INTERNAL RESISTANCES FOR COMPENSATION

The present application is based on Japanese patent application No. 2012-171916 filed on Aug. 2, 2012, the entire contents of which are incorporated herein by reference.

BACKGROUND OF THE INVENTION

1. Field of the Invention

This invention relates to an input device.

2. Description of the Related Art

As a conventional technique, an input device is known, the input device being configured to measure charging time in case that electrodes disposed in a capacitive touch panel (or capacitive touch screen) are charged, and discharging time in case that the electrodes are discharged so as to prevent misdetection (for example, refer to JP-A-2011-76515).

The input device includes a plurality of electrode pairs configured to be two-dimensionally arranged in a touch detection region, a selection circuit configured to sequentially select the plurality of electrode pairs respectively, a charging circuit configured to charge the electrode pair selected by the selection circuit, a charging time measurement circuit configured to measure a charging time from the time when the charging circuit starts to charge the electrode pair to the time when a predetermined upper threshold value is obtained, a discharging circuit configured to discharge the electrode pair charged, and a discharging time measurement circuit configured to measure a discharging time from the time when the discharging circuit starts to discharge the electrode pair charged to the predetermined upper threshold value to the time when a predetermined lower threshold value is obtained, so as to determine whether the touch of touch body to the touch region is detected or the detection is misdetection based on the ratio of the charging time to the discharging time.

SUMMARY OF THE INVENTION

The input device disclosed in JP-A-2011-76515 is configured to determine whether the detection is misdetection or not, but the input device is not configured to consider the influence provided by the internal resistance in the selection circuit, the measurement circuit or the like for the charging time and the discharging time, and is not configured to prevent an influence of the detection error so as to detect the touch.

It is an object of the invention to provide an input device that is capable of preventing the influence of the detection error so as to detect the touch.

(1) According to one embodiment of the invention, an input device comprises:

a selection circuit to which a plurality of electrodes disposed in a capacitive touch panel are connected;

a line connected to the selection circuit and having a same internal resistance as that between the plurality of electrodes and the selection circuit;

a constant current source configured to supply electric power of constant current to the plurality of electrodes;

an A/D conversion part connected to the selection circuit so as to measure a voltage of the plurality of electrodes or a measurement value when the line is connected thereto, wherein the plurality of electrodes and the line are each connected selectively to the A/D conversion part by the selection circuit; and a control part configured to control the selection circuit so as to allow the A/D conversion part to measure a voltage of one of the plurality of electrodes and the measurement value when the line is connected the A/D conversion part, and to calculate an electrostatic capacitance of one of the plurality of electrodes based on the voltage of one of the plurality of electrodes and the measurement value.

In the above embodiment (1) of the invention, the following modifications and changes can be made.

(i) The input device further comprises a corrective resistance connected to the selection circuit, wherein the A/D conversion part is configured to measure a measurement value when the corrective resistance is connected to the A/D conversion part, and wherein the control part is configured to subtract a value due to an influence of the internal resistance from the measurement value when the corrective resistance is connected to the A/D conversion part, subtract the value due to the influence of the internal resistance from the voltage of one of the plurality of electrodes, based on the measurement value when the line is connected to the A/D conversion part, and calculate the electrostatic capacitance of one of the plurality of electrodes.

(ii) The internal resistance comprises a first internal resistance between the plurality of electrodes and the selection circuit and a second resistance in the selection circuit.

(iii) The control part controls the selection circuit so as to allow the A/D conversion part to measure a voltage between the first internal resistance and the second internal resistance.

(iv) The control part controls the selection circuit so as to allow the A/D conversion part to measure the electrostatic capacitance of one of the plurality of electrodes by connecting only the one of the plurality of electrodes to the A/D conversion part.

Effects of the Invention

According to one embodiment of the invention, an input device can be provided that is capable of preventing the influence of the detection error so as to detect the touch.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Configuration of Input Device

Figure 1:
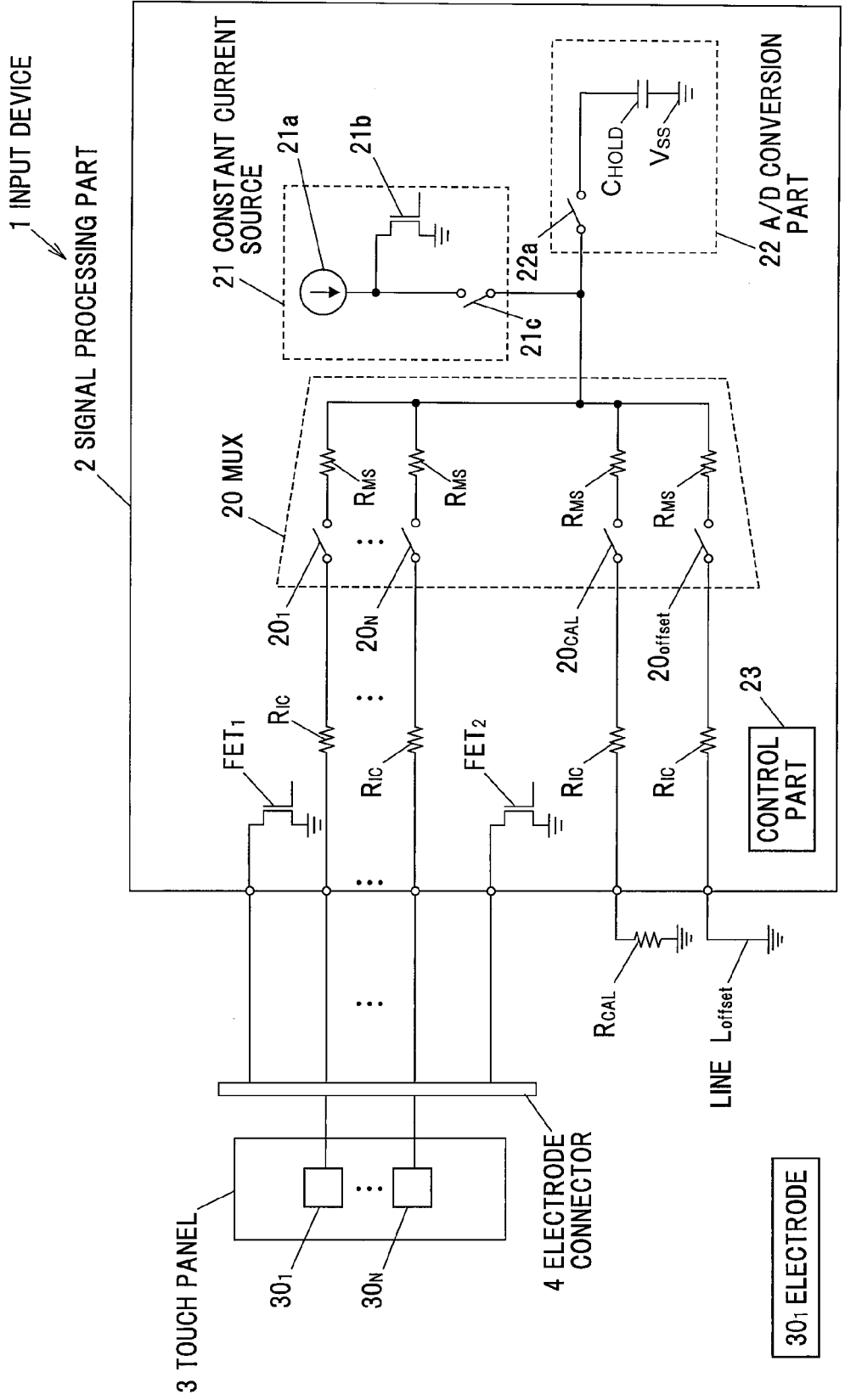
FIG. 1 is an explanatory view schematically showing a configuration example of an input device according to one embodiment of the invention.

FIG. 1 is an explanatory view schematically showing a configuration example of an input device according to one embodiment of the invention.

The input device 1 includes a signal processing part 2 configured to detect the change of electrostatic capacitance on a capacitive touch panel (or capacitive touch screen) 3 caused by an input operation of an operator so as to detect the touch coordinate, the touch panel 3 configured to have electrodes 30.sub.1 to 30.sub.N disposed under the touch detection region in a matrix state, and an electrode connector 4 configured to allow the signal processing part 2 and the touch panel 3 to be connected to each other.

In addition, the input device 1 is used as, for example, an operating part of an air-conditioning apparatus, an audio instrument and the like of vehicles, and used as an operating part of an electric appliance such as a portable music player, a mobile phone.

The signal processing part 2 is comprised of, for example, IC and the like, and includes a multiplexor (hereinafter referred to as "MUX") 20 as the selection circuit, a constant current source 21 configured to generate constant current, an A/D conversion part 22 configured to convert an analogue signal input to a digital signal, a corrective resistance $R_{CAL}$, a line $L_{offset}$ configured to be connected to ground, a field-effect transistor $FET_1$, $FET_2$, and the control part 23. Further, $R_{IC}$ is internal resistance of the signal processing part 2.

The MUX 20 includes switches $20_1$ to $20_N$, a switch $20_{CAL}$, and a switch $20_{offset}$ and the MUX 20 is configured to switch ON/OFF state of the switches $20_1$ to $20_N$, the switch $20_{CAL}$, and the switch $20_{offset}$, thereby to sequentially switch the electrodes $30_1$ to $30_N$, the corrective resistance $R_{CAL}$, and the line $L_{offset}$ directly grounded of the touch panel 3 so as to allow those to be connected thereto. Further, $R_{MS}$ is internal resistance of the MUX 20.

The constant current source 21 includes an electric current source 21a, configured to generate constant current, a field-effect transistor FET 21b configured to control output of constant current from the electric current source 21a to the outside of the constant current source 21, and a switch 21c configured to switch connection/disconnection between the constant current source 21 and the outside.

The A/D conversion part 22 includes a switch 22a configured to switch connection/disconnection between the A/D conversion part 22 and the outside and a capacitor for hold $C_{HOLD}$. Further, $V_{SS}$ represents ground voltage.

The control part 23 is configured to carry out the switching control of the switches $20_1$ to $20_N$, the switch $20_{CAL}$ and the switch $20_{offset}$ of the MUX 20, the control of the field-effect transistor FET 21b of the constant current source 21 and the switching control of the switch 21c, the control of the A/D conversion part 22 and the switching control of the switch 22a of the A/D conversion part 22, and the switching control of the field-effect transistors $FET_1$ and $FET_2$. Further, the field-effect transistors $FET_1$ and $FET_2$ are disposed for the purpose of countermeasures to surge current.

The touch panel 3 is configured to have a cover comprised of, for example, polyethylene terephthalate (PET) film, glass plate, or the like with which the touch detection region thereof is covered, and electrodes $30_1$ to $30_N$ formed such that a conductive film comprised of, for example, conductive polymer, ITO or the like is laminated on the rear surface of the cover by printing, sputtering, or the like, so as to be disposed in a matrix state. Further, the touch panel 3 can be formed so as to be overlapped with the display part.

Operation

Figure 2:
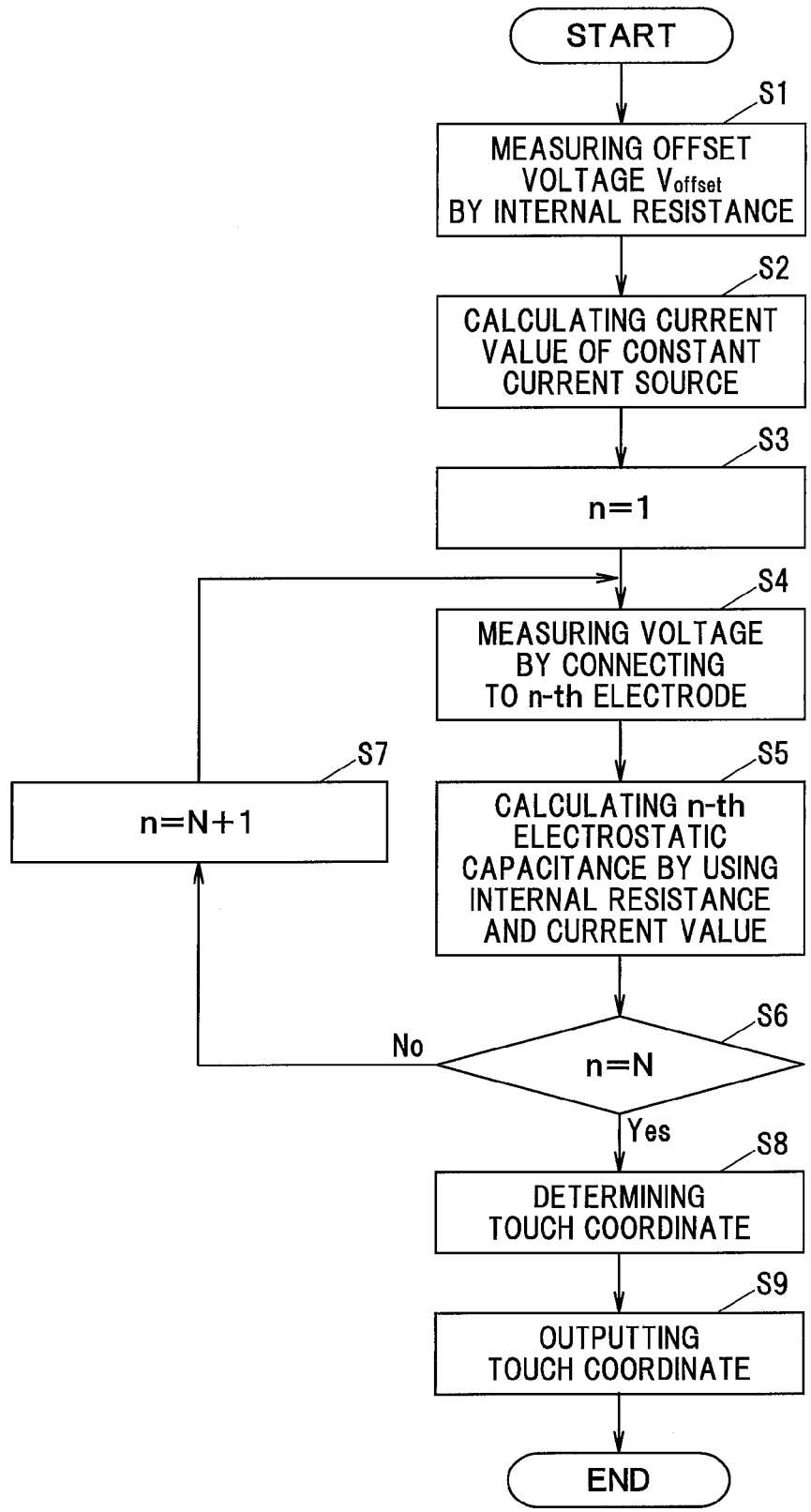
FIG. 2 is a flowchart showing an operation example of the input device according to the embodiment of the invention.

Hereinafter, the operation of the input device 1 will be explained referring to FIG. 1 and FIG. 2. Further, FIG. 2 is a flowchart showing an operation example of the input device according to the embodiment of the invention.

First, the control part 23 controls the MUX 20 to allow the switch $20_{offset}$ to be ON-state, and controls the A/D conversion part 22 to measure the offset voltage $V_{offset}$ between the internal resistances $R_{IC}$ and $R_{MS}$ (S1).

Next, the control part 23 controls the MUX 20 to allow the switch $20_{CAL}$ to be ON-state, and controls the A/D conversion part 22 to calculate the current value $I_{ch}$ flowing from the constant current source 21 to the corrective resistance $R_{CAL}$ based on the following formula (1) (S2). Further, the voltage between the corrective resistance $R_{CAL}$ and the internal resistances $R_{IC}$ and $R_{MS}$, namely, the voltage measured at the A/D conversion part 22 is defined as a voltage $V_{CAL}$. Then, the voltage applied to the corrective resistance $R_{CAL}$ is represented as "$V_{CAL} - V_{offset}$", thus the current value $I_{ch}$ is represented as the following formula (1).

$$I_{ch} = (V_{CAL} - V_{offset})/R_{CAL} \quad (1)$$

Next, the control part 23 controls the MUX 20 to select the switch $20_1$ of the electrode $30_1$ at first (S3), whereby the A/D conversion part 22 is allowed to measure the voltage applied to the electrode $30_1$ while the selected switch $20_1$ of the electrode $30_1$ is turned on and the switches $20_2$ to $20_N$ of the other electrodes $30_2$ to $30_N$ are turned off (S4).

Next, the electrostatic capacitance $C_1$ of the electrode $30_1$ is calculated by using the method shown below from the following formula (2) (S5).

First, the control part 23 controls the constant current source 21 to charge the electrode $30_1$ and the hold capacitor $C_{HOLD}$ for the predetermined time $T_{chg}$.

Next, the control part 23 controls the A/D conversion part 22 to measure the voltage $V_1$. If the voltage measured at the A/D conversion part 22 is defined as the voltage $V_1$, the voltage applied to the electrode $30_1$ is represented as "$V_1 - V_{offset}$", thus the electrostatic capacitance $C_n$ of the nth electrode 30 is represented as the following formula (2).

$$C_n = (I_{ch} \cdot T_{chg})/(V_n - V_{offset}) = [(V_{CAL} - V_{offset})/R_{CAL}] \cdot T_{chg}/(V_n - V_{offset}) \quad (2)$$

Further, the processing of the steps (S4) and (S5) is carried out at intervals of, e.g., 50 microseconds per one electrode for all the electrodes (S6, S7).

Further, if an electrostatic capacitance generated between a finger as one example of the touch body when users touch the touch panel 3 and the electrodes $30_1$ to $30_N$ is defined as an electrostatic capacitance $C_f$, the voltage V measured at the A/D conversion part 22 is represented as the following formula (3).

$$V = (I_{ch} \cdot T_{chg})/(C_n + C_f) \quad (3)$$

Next, the control part 23 determines the coordinate on the touch panel 3 which a finger or the like of users has touched based on the value calculated by the formula (3) (S8).

Next, the control part 23 outputs the determined coordinate on the touch panel 3 as the touch coordinate value (S9).

Further, the touch coordinate value output is converted to control signals in the outside or the control part 23 by referring tables or the like (not shown) configured such that the coordinate values preliminarily prepared and the control signals are correlated with each other, for example, so as to control an air-conditioning apparatus, an audio instrument and the like of vehicles, and control an operating of a portable music player, a mobile phone or the like.

Advantages of the Embodiment

According to the above-mentioned embodiment, the MUX 20 is connected to the corrective resistance $R_{CAL}$ and the line $L_{offset}$, and the voltage increase $V_{offset}$ due to the influence of the internal resistances $R_{IC}$ and $R_{MS}$ is calculated from the measurement value in case that the line $L_{offset}$ is connected thereto, and the current value $I_{ch}$, free of the influence of the internal resistances $R_{IC}$ and $R_{MS}$ is calculated from the measurement value in case that the corrective resistance $R_{CAL}$ is connected thereto, and finally the electrostatic capacitance of the electrodes $30_1$ to $30_N$ free of the influence of the internal resistances $R_{IC}$ and $R_{MS}$ is calculated, thus the touch of the touch body to the touch panel 3 can be detected in a state that the influence of the detection error based on the internal resistance is prevented.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An input device, comprising:
    a selection circuit to which a plurality of electrodes disposed in a capacitive touch panel are connected through a first line;
    a second line connected to the selection circuit and having a same internal resistance as that between the plurality of electrodes and the selection circuit wherein the second line is separate from the first line connecting the plurality of electrodes to the selection circuit;
    a constant current source configured to supply electric power of constant current to the plurality of electrodes;
    an A/D conversion part connected to the selection circuit so as to either measure a voltage of the plurality of electrodes when the first line is connected thereto or to measure a measurement value when the second line is connected thereto, wherein the plurality of electrodes and the second line are each connected selectively to the A/D conversion part by the selection circuit;
    a control part configured to control the selection circuit so as to allow the A/D conversion part to measure a voltage of one of the plurality of electrodes and the measurement value when the second line is connected to the A/D conversion part, and to calculate an electrostatic capacitance of one of the plurality of electrodes based on the voltage of one of the plurality of electrodes and the measurement value; and
    a third line connected to the selection circuit and comprising a corrective resistance and the same internal resistance as that between the plurality of electrodes and the selection circuit,
    wherein said second line is connected to a ground at one end thereof,
    wherein the A/D conversion part is configured to measure a measurement value when the corrective resistance is connected to the A/D conversion part, and
    wherein the control part is configured to subtract a value due to an influence of the internal resistance from the measurement value when the corrective resistance is connected to the A/D conversion part, subtract the value due to the influence of the internal resistance from the voltage of one of the plurality of electrodes, based on the measurement value when the second line is connected to the A/D conversion part, and calculate the electrostatic capacitance of one of the plurality of electrodes.

2. The input device according to claim 1, wherein the control part controls the selection circuit so as to allow the A/D conversion part to measure the electrostatic capacitance of one of the plurality of electrodes by connecting only the one of the plurality of electrodes to the A/D conversion part.

3. The input device according to claim 1, wherein the internal resistance comprises a first internal resistance between the plurality of electrodes and the selection circuit and a second resistance in the selection circuit.

4. The input device according to claim 3, wherein the control part controls the selection circuit so as to allow the A/D conversion part to measure a voltage between the first internal resistance and the second internal resistance.

* * * * *